(12) United States Patent
Miyamoto

(10) Patent No.: US 10,610,991 B2
(45) Date of Patent: Apr. 7, 2020

(54) TOOL CHANGING METHOD AND MACHINE TOOL

(71) Applicant: DMG MORI SEIKI CO., LTD., Nara (JP)

(72) Inventor: Satoshi Miyamoto, Nara (JP)

(73) Assignee: DMG MORI CO., LTD., Nara (JP)

( * ) Notice: Subject to any disclaimer, the term of this patent is extended or adjusted under 35 U.S.C. 154(b) by 126 days.

(21) Appl. No.: 16/053,482

(22) Filed: Aug. 2, 2018

(65) Prior Publication Data

US 2018/0339382 A1 Nov. 29, 2018

Related U.S. Application Data

(62) Division of application No. 14/255,468, filed on Apr. 17, 2014, now Pat. No. 10,065,281.

(30) Foreign Application Priority Data

Apr. 30, 2013 (JP) ................. 2013-095439

(51) Int. Cl.
*B23Q 3/157* (2006.01)
*B23Q 3/155* (2006.01)
*B23Q 17/00* (2006.01)

(52) U.S. Cl.
CPC ....... *B23Q 3/15713* (2013.01); *B23Q 3/1574* (2013.01); *B23Q 3/15503* (2016.11); *B23Q 17/002* (2013.01); *B23Q 2003/155428* (2016.11); *B23Q 2003/155439* (2016.11); *Y10T 483/13* (2015.01); *Y10T 483/1755* (2015.01)

(58) Field of Classification Search
CPC ............... Y10T 483/13; Y10T 483/136; Y10T 483/138; Y10T 483/1748; Y10T 483/1752; Y10T 483/1755; Y10T 483/1767; B23Q 2003/155425; B23Q 2003/155428; B23Q 2003/155435; B23Q 2003/155439; B23Q 2003/155414; B23Q 3/15713
USPC ........................ 483/7, 10, 11, 36, 38, 39, 44
See application file for complete search history.

(56) References Cited

U.S. PATENT DOCUMENTS

| 3,591,920 A | 7/1971 | Brainard et al. |
| 3,691,626 A | 9/1972 | Mousseau et al. |
| 3,840,981 A * | 10/1974 | Kielma ................ B23Q 3/1554 483/44 |
| 4,833,772 A | 5/1989 | Kobayashi et al. |

(Continued)

FOREIGN PATENT DOCUMENTS

| JP | 56033246 A * | 4/1981 | ............. B23Q 7/046 |
| JP | 63123646 A * | 5/1988 | ............. B23Q 5/347 |

(Continued)

*Primary Examiner* — Erica E Cadugan
*Assistant Examiner* — Michael Vitale
(74) *Attorney, Agent, or Firm* — Miller, Matthias & Hull LLP

(57) ABSTRACT

A machine tool includes a rotatable spindle, a spindle drive, a tool magazine, a tool changer including a rotating shaft, a rotating shaft drive motor, an angular position detector, a tool change arm having gripping units at both ends, and a controller. After interchanging a first tool mounted on the spindle and a second tool held in a tool pot, when rotating the tool change arm to an intermediate position, rotation of the spindle is started as soon as the second tool mounted on the spindle and the gripping unit are out of contact with each other.

5 Claims, 12 Drawing Sheets

(56) References Cited

U.S. PATENT DOCUMENTS

| | | | |
|---|---|---|---|
| 4,878,705 A | | 11/1989 | Arnquist |
| 5,144,740 A | | 9/1992 | Yasuda |
| 5,277,689 A | * | 1/1994 | Ruetschle ............. B23Q 3/1554 |
| | | | 279/106 |
| 5,337,623 A | * | 8/1994 | Huang .................. B23Q 3/1554 |
| | | | 74/53 |
| 5,752,905 A | * | 5/1998 | Yan ...................... B23Q 3/1554 |
| | | | 483/39 |
| 5,876,316 A | * | 3/1999 | Kato ...................... B23Q 3/157 |
| | | | 483/44 |
| 6,090,026 A | * | 7/2000 | Hosokawa ........... B23Q 1/4852 |
| | | | 483/36 |
| 6,186,014 B1 | * | 2/2001 | Kato .................... B23Q 3/1554 |
| | | | 74/53 |
| 2002/0094920 A1 | * | 7/2002 | Yasumatsuya ....... G05B 19/182 |
| | | | 483/1 |
| 2005/0077745 A1 | | 4/2005 | Kraft |

FOREIGN PATENT DOCUMENTS

| | | | | |
|---|---|---|---|---|
| JP | 05277868 A | * | 10/1993 | |
| JP | 2007237305 A | * | 9/2007 | ............. B23Q 5/347 |

* cited by examiner

TOOL CHANGING METHOD AND MACHINE TOOL

BACKGROUND

Field of the Disclosure

The present disclosure relates to methods of changing tools mounted on spindles of machine tools, and machine tools for machining a workpiece while changing tools by this tool changing method.

Background of the Disclosure

Conventionally, in a machining center or the like, an optimum tool is selected from a plurality of tools stored in a tool magazine according to the shape of a workpiece as a machining target and the machining method when machining this workpiece, and mounting and detachment of the tool on and from a spindle is automatically performed by an automatic tool changer (an ATC device). As a device automatically mounting and detaching a tool on and from a spindle, a tool changer as disclosed in the Japanese Unexamined Patent Application Publication No. 63-123646 and the like have been suggested.

This conventional tool changer includes a first sleeve rotatably supported on a headstock, a second sleeve which is to be integrally rotated with the first sleeve and is supported to be slidable in its axial direction, a turning arm fixed to a tip of the second sleeve and having tool gripping claws, a rotating shaft driven for rotation by a motor rotatably supported to the headstock, a cam indexer following a first cam actuated based on the rotation of the rotating shaft to cause the first sleeve to rotate, an axis feed following a second cam actuated based on the rotation of the rotating shaft to cause the second sleeve to reciprocate in its axial direction, a tool mounting and detaching device drive similarly following a fourth cam actuated based on the rotation of the rotating shaft to cause a tool mounting and detaching device on a spindle to be driven and cause a tool to be in a clamped/unclamped state, and other components.

According to this tool changer, first, the spindle after one machining is finished is moved to a tool changeable position called an ATC origin position (a tool change position) and the rotation of the spindle is stopped. Also, among tool pots contained in a tool magazine, a tool pot in which the next tool is held is indexed at the tool changeable position. Next, by rotating the drive shaft, the turning arm is turned in a predetermined direction from its original position via the first sleeve and the second sleeve by the cam indexer. Thereby, the second sleeve to which the turning arm is fixed is moved upward by the axis feeder, and the current tool mounted on the spindle and the next tool held in the tool pot are gripped by the tool gripping claws.

Next, by further turning the turning arm in the predetermined direction with the both tools gripped by the tool gripping claws, the tool mounted on the spindle is caused to be in an unclamped state by the tool mounting and detaching device drive. Further, the second sleeve is moved downward by the axis feeder to cause the current tool and the next tool to be pulled out from the spindle and the tool pot, respectively. Thereafter, the turning arm is further turned in the same direction to move the second sleeve upward, that is, move the turning arm upward, and the next tool and the current tool are mounted on the spindle and the tool pot, respectively, and the tool mounted on the spindle is caused to be in a clamped state. Then, the turning arm is turned to release the gripping of the next tool and the current tool by the tool gripping claws, and the turning arm is returned to its original position, thereby ending the series of processes for tool change.

Meanwhile, in the above-described conventional tool changer, to avoid interference with the turning arm, a spindle head including the spindle is stopped at the tool change position during tool change, and the spindle head is moved to a position where machining is started (a machining position) after completion of tool change. However, since the spindle head is moved after completion of tool change, it is impossible to proceed to the next machining until tool change is finished, which causes a standby time until the next machining.

To address this, as a technique for reducing the standby time, a tool changing system has been suggested in which, when it is determined that there is no possibility of interference between the turning arm and the spindle head, the spindle head is moved before the turning arm is returned to its original position, and the rotation of the spindle is started along with the movement of the spindle head (the Japanese Unexamined Patent Application Publication No. 2007-237305).

Thus, starting the movement of the spindle head and the rotation of the spindle before the turning arm is returned to its original position, that is, before tool change is completed makes it possible to reduce the standby time until the next machining.

Meanwhile, in the above-described tool changing system, when the spindle is moved toward the machining position after the next tool is mounted on the spindle, the spindle has to be moved along a tangent direction so as to be away from the turning arm in order to avoid a collision between the spindle and the turning arm.

However, among machine tools, some are configured to move the spindle in a direction along the axis of the spindle when the spindle is moved toward the machining position after the next tool is mounted on the spindle. In a machine tool thus configured, to avoid a collision between the spindle and the turning arm, the movement of the spindle head and the rotation of the spindle cannot be started unless the turning arm has been returned to its original position.

That is, in the above-described tool changing system, it is merely possible to reduce the standby time until the next machining only when the spindle is moved along a tangent direction so as to be away from the turning arm after the next tool is mounted on the spindle. In other cases, a problem of occurrence of the standby time still remains. Further, in the PTL 2, neither specific method nor means for reducing the standby time until the next machining in other cases is disclosed.

SUMMARY OF THE DISCLOSURE

According to one aspect of this disclosure, a tool changing method is provided that is capable of reducing the standby time irrespective of the direction in which the spindle is moved toward the machining position, and a machine tool is provided for machining a workpiece while changing tools by this tool changing method.

According to this disclosure, a machine tool may include a spindle on which a tool is to be mounted, a feed drive which moves the spindle, a spindle rotation drive which rotates the spindle, a tool magazine which holds and stores a plurality of tools, a tool change arm provided with gripping units at both ends and disposed between a tool mounted on the spindle and a tool held in a holding unit at a standby position, an arm rotation drive which rotates the tool change arm about an axis parallel to an axis of the spindle, a detector which detects a state in which the tool and the gripping unit of the tool change arm are disengaged from each other, and a controller which controls operations of the feed drive, the spindle rotation drive and the arm rotation drive, wherein the controller is configured to:

move the spindle to a tool change position;

actuate the gripping units to grip the tool mounted on the spindle and the tool held in the holding unit at the standby position;

detach the tools from the spindle and the holding unit, rotate the tool change arm at 180° so that the positions of the tools are interchanged, and mount the two tools interchanged in position on the spindle and the holding unit;

release gripping of the tool mounted on the spindle after mounting the two tools interchanged in position;

initiate rotation of the spindle; and move the spindle to a machining position, wherein initiating rotation of the spindle is performed based on a detection result by the detector, at a time point when the tool mounted on the spindle after the interchange and the gripping unit of the tool change arm are disengaged from each other, and moving the spindle to the machining position is performed either simultaneously with or after initiating rotation of the spindle.

According to additional aspects of this disclosure, a tool changing method is provided for a machine tool including a spindle on which a tool is to be mounted, a tool magazine which holds and stores a plurality of tools, and a tool change arm provided with gripping units at both ends and rotating about an axis parallel to an axis of the spindle, the method including:

moving the spindle to a tool change position, and then gripping a tool mounted on the spindle and a tool held in a holding unit at a standby position by the gripping units;

subsequently, detaching the tools from the spindle and the holding unit, rotating the tool change arm at 180° to interchange the positions of the two tools, and mounting the tools interchanged in position on the spindle and the holding unit;

thereafter, releasing gripping of the tool mounted on the spindle after the interchange; and after the releasing, moving the spindle to a machining position, wherein while a state where the tool mounted on the spindle and the gripping unit of the tool change arm are disengaged from each other is detected, initiating rotation of the spindle at a time point when the tool mounted on the spindle after the interchange and the gripping unit of the tool change arm are disengaged from each other, and the spindle is moved to the machining position either simultaneously with or after initiating the rotation of the spindle.

After a workpiece is machined by a tool mounted on the spindle (a current tool), the spindle may be moved by the feed drive to the tool change position as a position where tool change is to be performed. Further, among the plurality of tools held in the tool magazine, a tool for use in the next machining (a next tool) may be indexed at the standby position together with the holding unit.

Subsequently, the current tool and the next tool may be gripped by the gripping units of the tool change arm. Note that an appropriate method can be employed as the method of gripping the two tools by the gripping units of the tool change arm according to the shape of the tool change arm and the like. Specific examples include a method of rotating an S-shaped tool change arm to swing the gripping units toward the tools for gripping and a method of gripping the tools after the spindle is moved toward an H-shaped tool change arm. Note that, in the method of moving the spindle toward an H-shaped tool change arm, the tool change position is the position of the gripping unit on one end of the tool change arm.

Next, the tools may be detached from the spindle and the holding unit, respectively, the tool change arm may be rotated at 180° to interchange the positions of the current tool and the next tool, and the two tools interchanged in position may be mounted on the spindle and the holding unit, respectively. Thereby, the state is such that the next tool is mounted on the spindle and the current tool, which has been previously mounted on the spindle, is held by the holding unit. Note that the detachment of the tools and the mounting of the tools may be performed in conjunction with the rotation of the tool change arm or may be performed individually.

Thereafter, the gripping of the tool mounted on the spindle after the interchange (the next tool) may be released. At this time, a state where the next tool mounted on the spindle and the gripping unit of the tool change arm are disengaged from each other is detected by the detector, and the rotation of the spindle is started at the time point when they are disengaged. Then, simultaneously with the start of the rotation of the spindle or after the start of the rotation of the spindle, the spindle is moved to the machining position as a position where machining is started, thereby completing tool change.

As such, the state where the next tool mounted on the spindle and the gripping unit of the tool change arm are disengaged from each other may be detected, and the rotation of the spindle may be initiated at the time point when they are in the disengaged state. Therefore, irrespective of the direction in which the spindle is moved toward the machining position, the rotation of the spindle can be initiated, and thereby a standby time until machining is started can be reduced.

The detector can be configured to have an angular position detector which detects an angular position of the tool change arm and detect, based on the angular position, the state where the tool and the gripping unit of the tool change arm are disengaged from each other. In this case, for example, the disengaged state can be detected by setting, in advance, based on the dimensions of the tool, the shape of the gripping unit, or the like, an angular position of the tool change arm where the tool and the gripping unit are disengaged from each other and comparing the detected angular position and the set angular position.

Further, the detector may be configured to have a position detector which detects a position of the tool change arm with respect to the spindle and detects, based on the detected position, the state where the tool and the gripping unit of the tool change arm are disengaged from each other. Also in this case, the disengaged state can be detected by setting, in advance, based on the dimensions of the tool, the shape of the gripping unit, or the like, a position of the tool change arm where the tool and the gripping unit are in the disengaged state and comparing the detected position and the set position.

Furthermore, each of the gripping units at both ends of the tool change arm may be configured to have a fixed claw formed at the end of the tool change arm and a movable claw disposed to face the fixed claw and grip a tool by the fixed claw and the movable claw, and the detector may be configured to have a forward-backward position detector which detects a forward-backward position of the movable claw and detect, based on the forward-backward position, the state where the tool and the gripping unit of the tool change arm are disengaged from each other. Also in this case, as with the above, the disengaged state can be detected by setting, in advance, a forward-backward position of the movable claw where the tool and the gripping unit of the tool change arm are in the disengaged state and comparing the detected forward-backward position and the set forward-backward position.

Further, the detector may be configured to have a current detector which detects formation of an electrically closed circuit among the tool mounted on the spindle, the spindle, a machine body of the machine tool, and the gripping unit of the tool change arm and detect, based on whether an electrically closed circuit is formed, the state where the tool and the gripping unit of the tool change arm are disengaged from each other. In this case, while an electrically closed circuit is formed in a state where the tool and the gripping unit of the tool change arm are in contact with each other, an electrically closed circuit is not formed in the disengaged state. Therefore, the disengaged state can be detected by detecting formation of an electrically closed circuit.

According to the tool changing method and machine tool of the present disclosure, the standby time can be reduced by initiating rotation of the spindle, irrespective of the direction in which the spindle is moved toward the machining position and, in turn, an overall machining time can be reduced.

BRIEF DESCRIPTION OF THE DRAWINGS

For a more complete understanding of the disclosed methods and apparatus, reference should be made to the embodiment illustrated in greater detail on the accompanying drawings, wherein.

Figure 1:
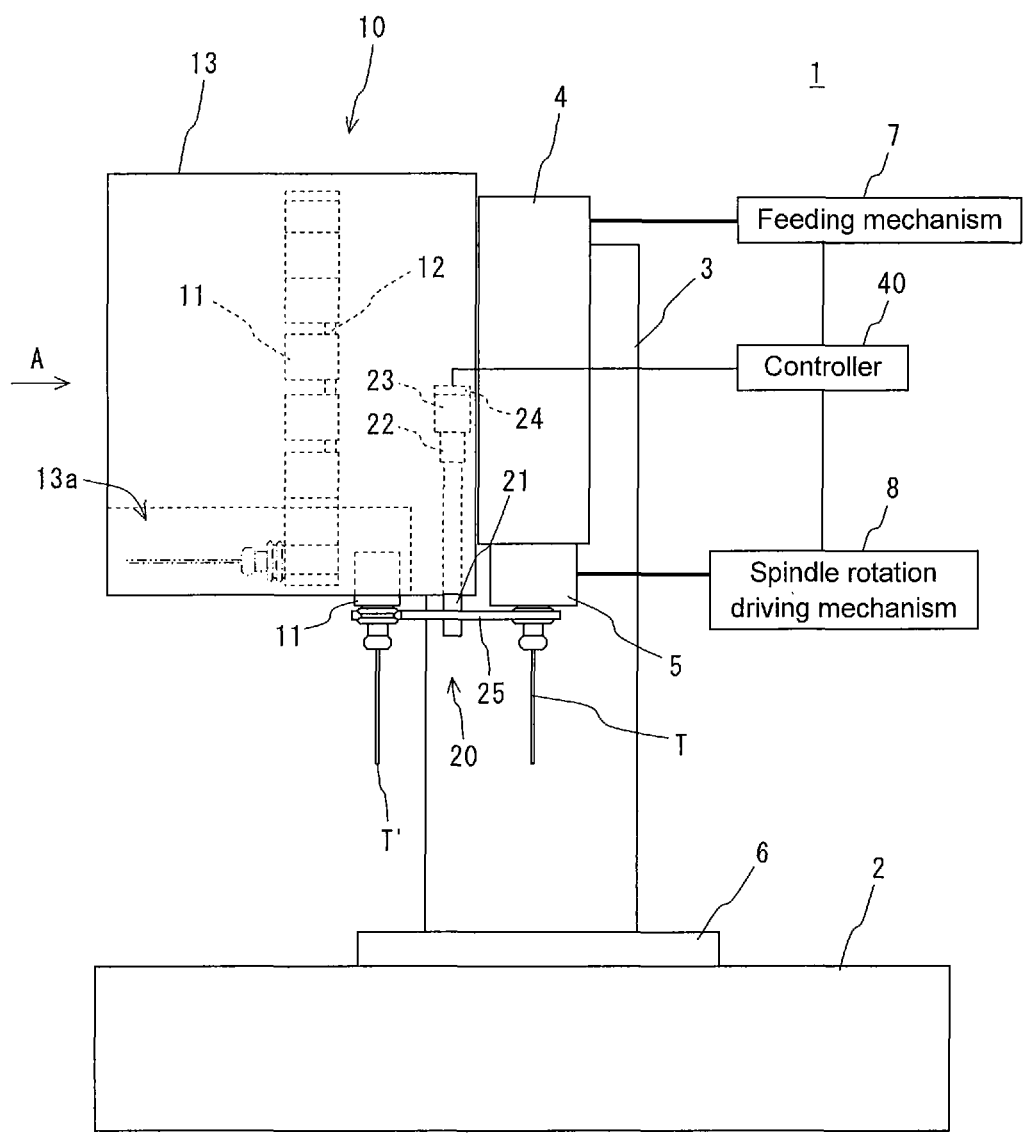
FIG. 1 is a front view of a machine tool according to one embodiment of the present disclosure.
Figure 2:
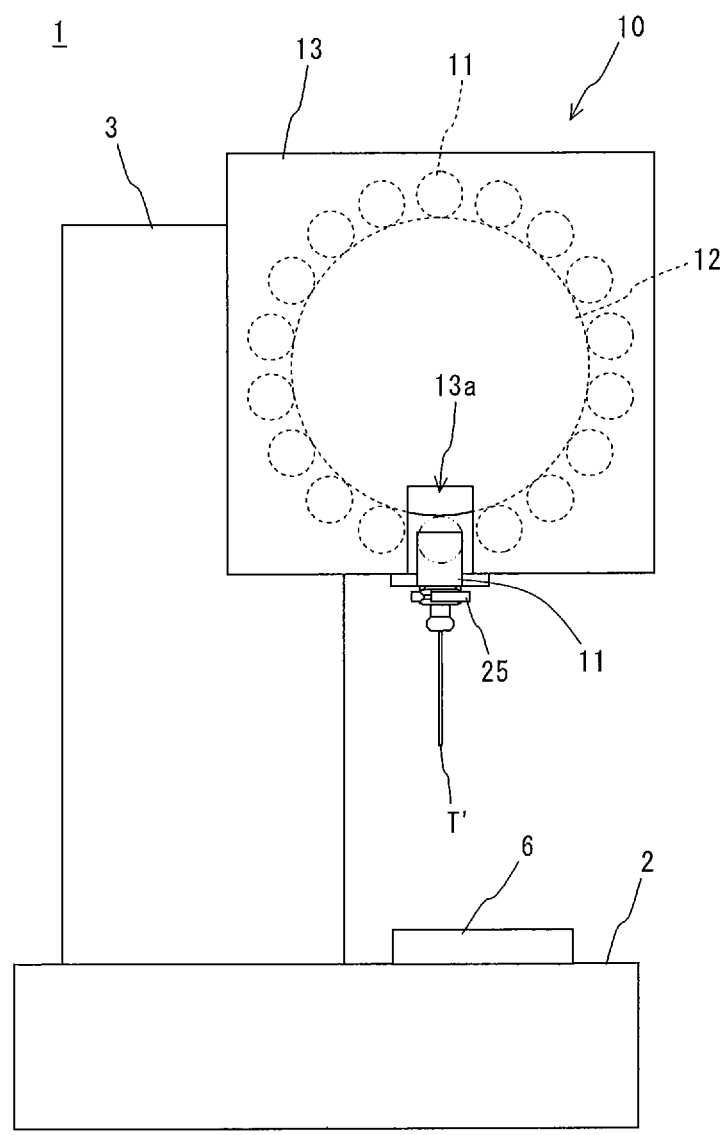
FIG. 2 is a side view as viewed in the direction of an arrow A in FIG. 1.
Figure 3:
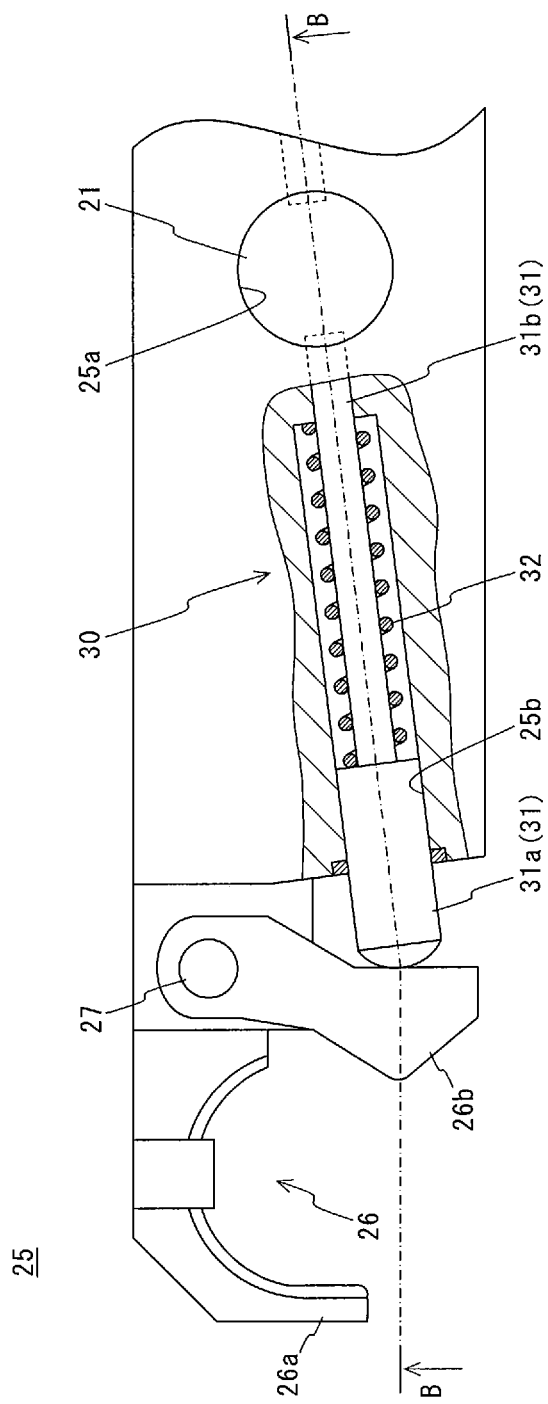
FIG. 3 is a partially sectional plan view of a tool change arm.
Figure 4:
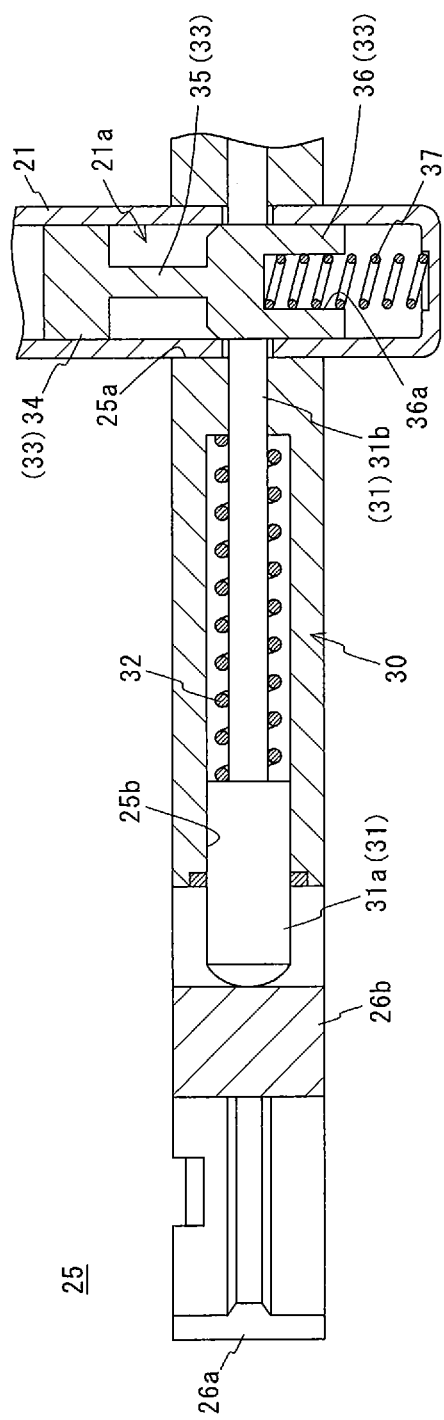
FIG. 4 is a sectional view taken along arrows B-B in FIG. 3.

It should be understood that the drawings are not necessarily to scale and that the disclosed embodiments are sometimes illustrated diagrammatically and in partial views. In certain instances, details which are not necessary for an understanding of the disclosed methods and apparatus or which render other details difficult to perceive may have been omitted. It should be understood, of course, that this disclosure is not limited to the particular embodiments illustrated herein.

DETAILED DESCRIPTION

Specific embodiments are described below with reference to the drawings.

First Embodiment

As depicted in FIGS. 1-4, a machine tool 1 according to a first embodiment is a vertical machining center, and comprises a bed 2, a column 3 vertically provided on the bed 2, a spindle head 4 supported by the column 3 and movable in the vertical direction, a spindle 5 supported by the spindle head 4 to be rotatable about its axis, a table 6 disposed on the bed 2 beneath the spindle 5, a feed drive 7 for moving the spindle head 4, a spindle rotation drive 8 for rotating the spindle 5, a tool magazine 10 disposed on a side of the spindle head 4, a tool changer 20 provided on a lower end portion of the tool magazine 10 for changing a tool T mounted on the spindle 5 to a tool T' stored in a tool pot 11 of the tool magazine 10, and a controller 40 for controlling operations of these components.

The tool magazine 10 comprises a plurality of tool pots 11 each holding a tool T', a disk-shaped holding plate 12 holding the tool pots 11 at regular intervals on its outer circumferential portion, and a cover body 13 surrounding the tool pots 11 and the holding plate 12 and having an opening 13a formed at its lower portion. Also, the holding plate 12 is configured to be driven for rotation about its center axis by an appropriate rotation drive (not depicted), and a tool pot 11 holding a desired tool T' can be indexed at the opening 13a of the cover body 13 (hereinafter, referred to as an "indexed position") from among the tool pots 11 held by the holding plate 12 by the rotation of the holding plate 12. Furthermore, the tool pot 11 indexed at the indexed position is turned in a vertical plane by an appropriate turning drive (not depicted) and transferred to a standby position where the tool pot 11 is parallel to the spindle 5. The tool pot 11 transferred to the standby position is similarly turned in a vertical plane by the turning drive and again transferred to the indexed position.

The tool changer 20 comprises a rotating shaft 21 disposed at an intermediate point between the spindle 5 and the tool pot 11 transferred to the standby position so that its axis is parallel to the axis of the spindle 5 and having a containing hole 21a formed at t is lower end, a drive motor 23 as an arm rotation drive for rotating the rotating shaft 21 about its axis via a cam 22, an angular position detector 24 provided to the drive motor 23, a tool change arm 25 having gripping units 26 for gripping the tools T and T' formed at both ends thereof, the arm fixedly provided at a lower end of the rotating shaft 21, and a fixing mechanism 30 for fixing a gripping state of the tools T and T' gripped by the gripping units 26. Note that, with a rotational power transmitted from the drive motor 23 to the cam 22, the rotating shaft 21 rotates about its axis and vertically moves in its axial direction and the tool change arm 25 rotates and vertically moves together with the rotating shaft 21. And, the tool change arm 25 is configured to be at the most upward/downward position in the state depicted in FIG. 1, that is, in the state of being positioned at a gripping position.

Also, the angle position detector 24 comprises a rotary encoder coupled to the drive motor 23 and others, and is configured to detect an angular position of the rotating shaft 21, that is, an angular position of the tool change arm 25, based on the rotational position of the drive motor 23, and transmit the detection result to the controller 40.

Each gripping unit 26 at both ends of the tool change arm 25 comprises a fixed claw 26a having an arc shape in a planar view and formed at the end of the tool change arm 25 and a movable claw 26b supported to a main body of the tool change arm 25 by a pin 27 in a state of facing the fixed claw 26a. The movable claw 26b is configured to swing about the pin 27. Note that the main body of the tool change arm 25 has a guide hole 25b formed therein, the hole communicating with a through hole 25a through which the rotating shaft 21 is inserted, and being open at a portion facing the movable claw 26b of the main body of the tool change arm 25.

The fixing mechanism 30 comprises a biasing rod 31 having a large-diameter unit 31a formed at one end side thereof and a small-diameter unit 31b formed at the other end side thereof and contained in the guide hole 25b of the tool change arm 25 so as to be movable forward and backward with the tip of the large-diameter unit 31a pressed onto the movable claw 26b, and a regulating rod 33 contained in the containing hole 21a of the rotating shaft 21 so as to be movable forward and backward and regulating the backward motion of the biasing rod 31.

The biasing rod 31 has a biasing spring 32 wound around the small-diameter unit 31b. With this biasing spring 32, the tip of the large-diameter unit 31a is pressed onto the movable claw 26b as described above. Thereby, the movable claw 26b is in a state of being swung about the pin 27 and biased toward the fixed claw 26a.

The regulating rod 33 has, in the order from its upper end side, a pressed unit 34, a small-diameter unit 35, and a large-diameter unit 36 formed therein. The large-diameter unit 36 has a containing hole 36a formed therein, which opens to a lower end face of the large-diameter unit 36. By a biasing spring 37 disposed inside the containing hole 36a, the large-diameter unit 36 is biased upward. And, in a state where the large-diameter unit 36 of the regulating rod 33 is biased upward by the biasing spring 37 with the tool change arm 25 moved downward, a rear end of the small-diameter unit 31b of the biasing rod 31 is in contact with the large-diameter unit 36. Thereby, the backward motion of the biasing rod 31 is regulated, and the movable claw 26b is brought into a state of being fixed. Note that this state is hereinafter referred to as a "fixed state". On the other hand, in a state where an appropriate pressing member is pressed onto the pressed unit 34 of the regulating rod 33 by a force equal to or larger than a biasing force of the biasing spring 37 with the tool change arm 25 moved upward, the state where the rear end of the small-diameter unit 31b of the biasing rod 31 is in contact with the large-diameter unit 36 is released. Thereby, the regulation of the backward motion of the biasing rod 31 is released, and the fixed state of the movable claw 26b is released. Note that this state is hereinafter referred to as a "non-fixed state".

Therefore, in the tool changer 20, by rotating the tool change arm 25 at 90° about the axis of the rotating shaft 21 (this is performed in a "positive direction") from the state where the tool change arm 25 is at an intermediate position, the tool change arm 25 is rotated at 90° to be positioned at the gripping position and the tool change arm 25 is moved downward therefrom, thereby causing the movable claw 26b to be in the fixed state. On the other hand, the tool change arm 25 is rotated at 180° in the reverse direction from the gripping position and is moved upward therefrom, thereby causing the movable claw 26b to be in the non-fixed state.

Next, the controller 40 is described with reference to FIG. 5 and FIG. 6.

Figure 5:
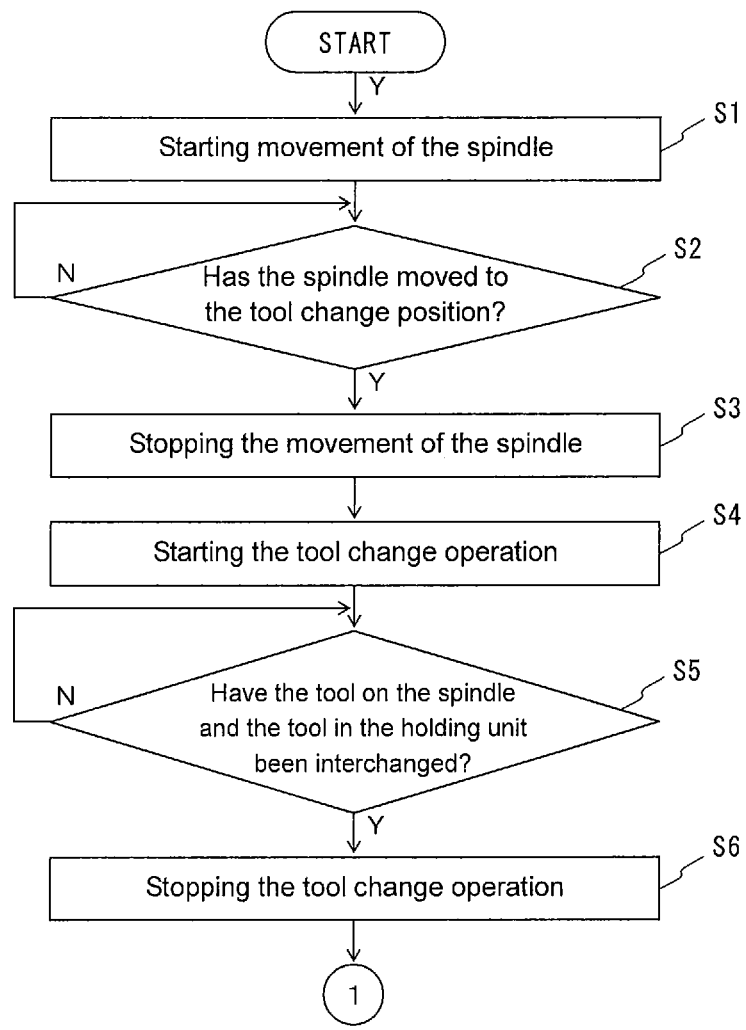
FIG. 5 is a flowchart of a tool change procedure in a machine tool according to a first embodiment.
Figure 6:
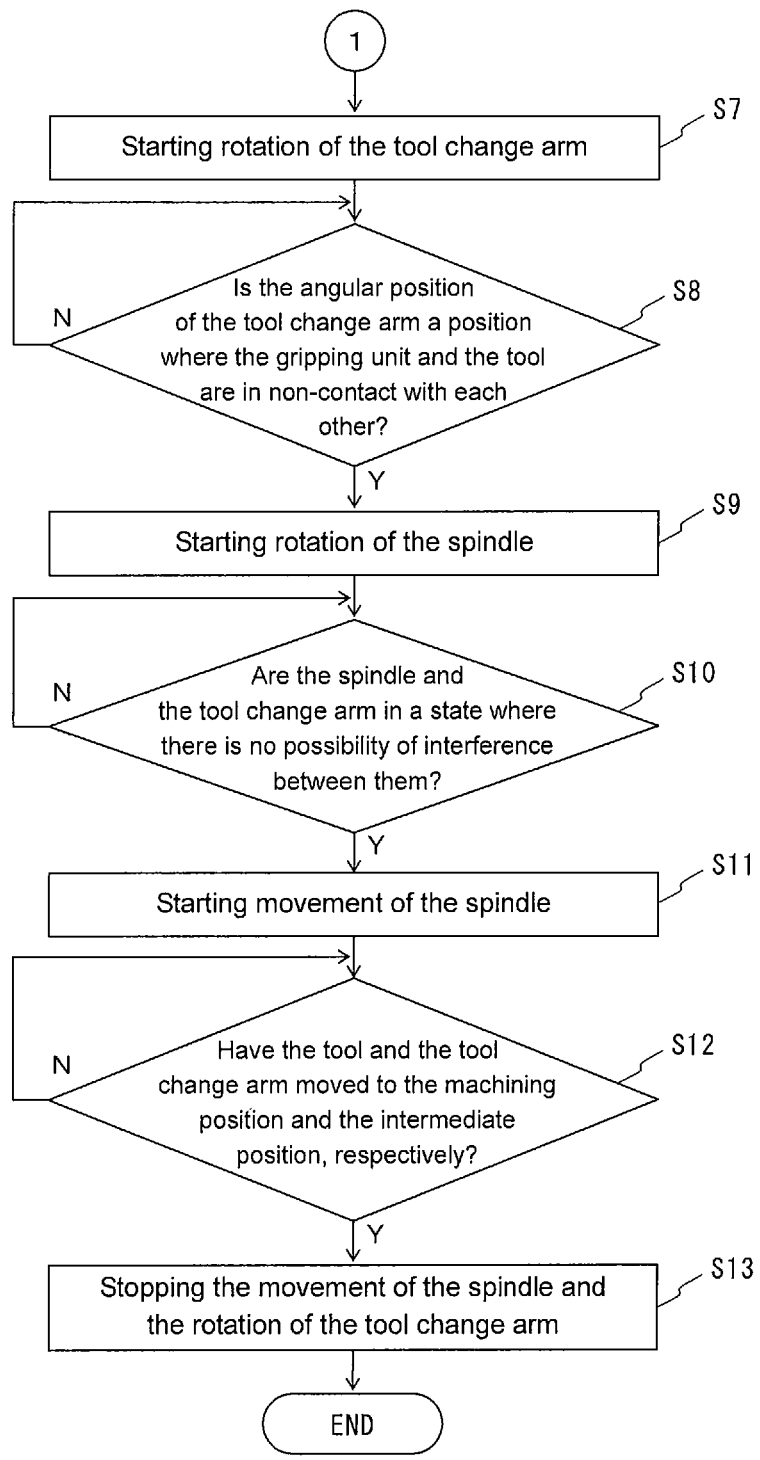
FIG. 6 is a flowchart of the tool change procedure in the machine tool according to the first embodiment.

The controller 40 is, as described above, a device which controls operations of the components of the machine tool 1, and is configured to perform a series of processes depicted in FIG. 5 and FIG. 6 to perform tool change.

First, an operation command is transmitted to the feed drive 7 and, by the feed drive 7, the movement of the spindle 5 is started together with the spindle head 4 (step S1). It is determined whether the spindle 5 has moved to the tool change position (step S2). When it is determined that the spindle 5 has moved to the tool change position, the movement of the spindle 5 is stopped (step S3), and the procedure proceeds to step S4. When it is determined that the spindle 5 has not moved, the process at step S2 is performed again.

Next, at step S4, a tool changing operation is started. Specifically speaking, an operation command is transmitted to the drive motor 23 to rotate the tool change arm 25 at 90° in the positive direction, and the tool T mounted on the spindle 5 and the tool T' held in the tool pot 11 indexed at the standby position are gripped by the gripping units 26. Thereafter, the tool change arm 25 is rotated at 180° in the reverse direction to mount the tool T' on the spindle 5 and cause the tool T to be held in the tool pot 11. Then, it is determined whether the tool T mounted on the spindle 5 and the tool T' held in the tool pot 11 have been interchanged (step S5). When it is determined that they have been interchanged, the tool changing operation is stopped (step S6), and the procedure proceeds to step S7. When it is determined that they have not been interchanged, the process at step S5 is performed again.

Next, an operation command is transmitted to the drive motor 23 to start rotation of the tool change arm 25 in the reverse direction so that the tool change arm 25 rotates to the intermediate position (step S7). Then, it is determined whether the angular position of the tool change arm 25 is an angular position where the gripping unit 26 and the tool T' mounted on the spindle 5 are disengaged from each other (step S8). As used herein, the term "disengaged" is intended to encompass a state where two components do not contact one another. When it is determined that the angular position is the disengaged (i.e., "non-contact") angular position, an operation command is transmitted to the spindle rotation drive 8 to start rotation of the spindle 5 (step S9), and the procedure proceeds to step S10. When it is determined that the angular position is not the disengaged angular position, the process at step S8 is performed again.

Next, it is determined whether there is a possibility of interference between the spindle 5 and the tool change arm 25 (step S10). When it is determined that there is no possibility of interference, an operation command is transmitted to the feed drive 7 and, by this feed drive 7, the movement of the spindle 5 is started together with the spindle head 4 (step S11). Then, it is determined whether the spindle 5 has moved to a position where machining is started (a machining position) and the tool change arm 25 has rotated to the intermediate position (step S12). When it is determined that said movement of the spindle 5 and said rotation of the tool change arm 25 have been completed, the movement of the spindle 5 and the rotation of the tool change arm 25 are stopped (step S13) and the series of processes of tool change is ended. On the other hand, when it is determined that the spindle 5 has not moved to the machining position and the tool change arm 25 has not rotated to the intermediate position, the process at step S12 is performed again.

Next, a tool change in the machine tool 1 having the above-described configuration is described in detail.

According to the machine tool 1 of the present embodiment, with the tool change arm 25 positioned at the intermediate position, in a case where, after machining a workpiece by the tool T mounted on the spindle 5, the workpiece is to be machined using the tool T' different from the tool T in the next machining, the spindle 5 is first moved to the tool change position together with the spindle head 4 by the feed drive 7. Also, as described above, the tool pot 11 in which the next tool T' is held is indexed at the indexed position by an appropriate rotation drive, and is then transferred to the standby position by an appropriate turning drive.

Next, the drive motor 23 is actuated to rotate the rotating shaft 21 at 90° in the positive direction. Thereby, the tool change arm 25 rotates about the rotating shaft 21 from the intermediate position and is brought into a state of being positioned at the gripping position at 90° from the intermediate position, and the tool T mounted on the spindle 5 and the tool T' held in the tool pot 11 are gripped by the gripping units 26, respectively. Note that, at this point in time, the movable claws 26b are in the non-fixed state, and each of the gripping forces acting on the tools T and T' depend on a force by which the biasing rod 31 is pressed onto the movable claw 26b, that is, a biasing force by the biasing spring 32.

Next, the tool change arm 25 moves downward in a direction along the axis of the rotating shaft 21 to cause the tools T and T' to be extracted from the spindle 5 and the tool pot 11, respectively. Thereafter, the drive motor 23 is actuated to rotate the rotating shaft 21 at 180° in the reverse direction. Thereafter, the tool change arm 25 moves upward similarly in the direction along the axis of the rotating shaft 21 to mount the next tool T' on the spindle 5 and hold the current tool T in the tool pot 11. As such, the tool T mounted on the spindle 5 is changed to the tool T' for use in the next machining. Note that, while the tool change arm 25 at the gripping position is being rotated at 180° in the reverse direction, the movable claws 26b are brought into the fixed state, thereby preventing the tools T and T' gripped by the gripping units 26 from dropping off.

Thereafter, the drive motor 23 is actuated to start the rotation of the rotating shaft 21 in the reverse direction. Then, the angular position of the tool change arm 25 is detected by the angular position detector 24 and, when the detected angular position becomes an angular position where the gripping unit 26 and the tool T' mounted on the spindle 5 are disengaged from each other, the rotation of the spindle 5 is started by the spindle rotation drive 8. Note that the angular position where the gripping unit 26 and the tool T' mounted on the spindle 5 are disengaged from each other can be set based on the dimensions of the tool T', the shape of the gripping unit 26, and the like.

Thereafter, after the tool change arm 25 is rotated to a position where there is no possibility of interference between the tool change arm 25 and the spindle 5 when the movement of the spindle 5 toward the machining position is started, the movement of the spindle 5 is started.

Then, while the movement of the spindle 5 is stopped at the time point when the spindle 5 is moved to the machining position, the rotation of the tool change arm 25 is stopped at the time point when the tool change arm 25 is rotated to the intermediate position. Thereby, the series of processes for tool change is terminated, and then the next machining is started.

As described above, according to the machine tool 1 of the present embodiment, a tool change can be automatically performed under the control by the controller 40. Also, after the tool T' for use in the next machining is mounted on the spindle 5, a state where the gripping unit 26 of the tool change arm 25 and the tool T' are disengaged from each other is detected based on the angular position of the tool change arm 25, and, at the time point when they are disengaged from each other, the rotation of the spindle 5 can be initiated. Therefore, irrespective of the direction in which the spindle 5 is moved toward the machining position, the rotation of the spindle 5 can be initiated prior to the movement of the spindle 5, and thereby the standby time can be shortened as much as possible and, in turn, the overall machining time can be reduced.

Although one embodiment has been described in the foregoing, specific modes that can be adopted in the presently disclosed subject matter are not restricted thereto at all.

For example, although the movement of the spindle 5 is started after the rotation of the spindle 5 is initiated in the example described above, the movement of the spindle 5 may be started simultaneously with initiation of rotation of the spindle 5.

Also, although the tool change arm 25 is rotated to swing the gripping units 26 to the tool T at the tool change position and the tool T' at the standby position in the example described above, this is not meant to be restrictive. For example, the gripping units of the tool change arm may be positioned in advance at the tool change position, and the spindle may be moved toward the gripping units. Note that, in this case, the shape of the tool change arm is not restricted to an S shape but may be an H shape.

Furthermore, although the state where the gripping unit 26 and the tool T' are disengaged from each other is detected based on the angular position of the tool change arm 25 in the example described above, this is not meant to be restrictive. The state where they are disengaged from each other may be detected by another detector. This is described below as second to fourth embodiments.

Second Embodiment

Figure 7:
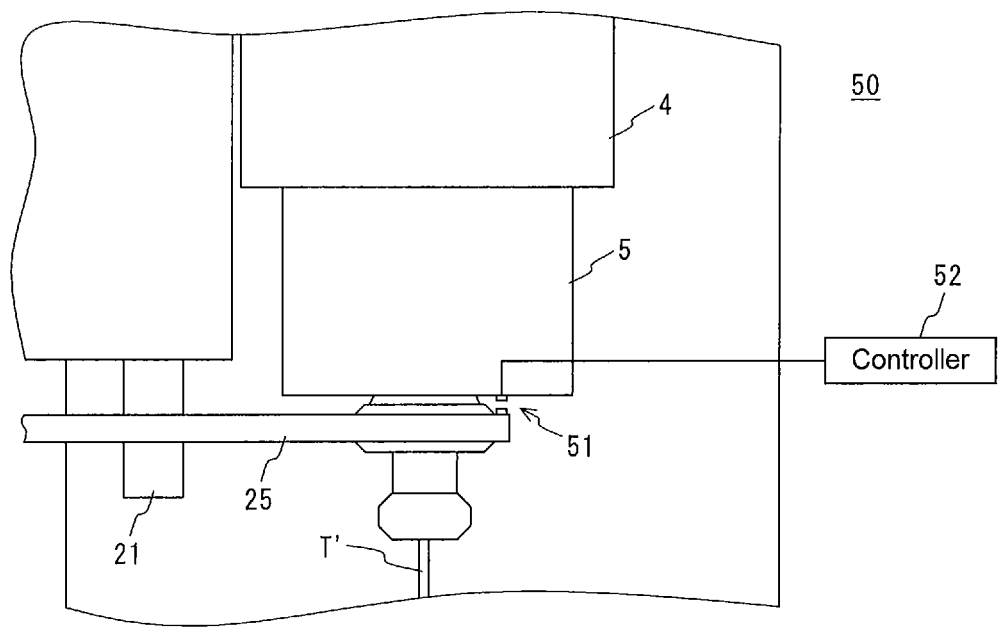
FIG. 7 is a partially enlarged front view of a machine tool according to a second embodiment of the present disclosure.

First, a second embodiment is described with reference to FIG. 7 and FIG. 8, where the state in which the tool mounted on the spindle and the tool change arm are disengaged from each other is detected based on the position of the tool change arm with respect to the spindle. Note that FIG. 7 is a partially-enlarged front view of a machine tool 50 according to the second embodiment, and the components identical in structure to those of the machine tool 1 are provided with the same reference characters and not described in detail. Further, FIG. 8 is a flowchart of a tool change procedure in the machine tool 50.

In this machine tool 50, paired proximity sensors 51 as a position detector for detecting the position of the tool change arm 25 with respect to the spindle 5 are provided to a tip portion of the spindle 5 and the gripping unit on one end side of the tool change arm 25. The proximity sensors 51 are configured to transmit the detection result to a controller 52.

Figure 8:
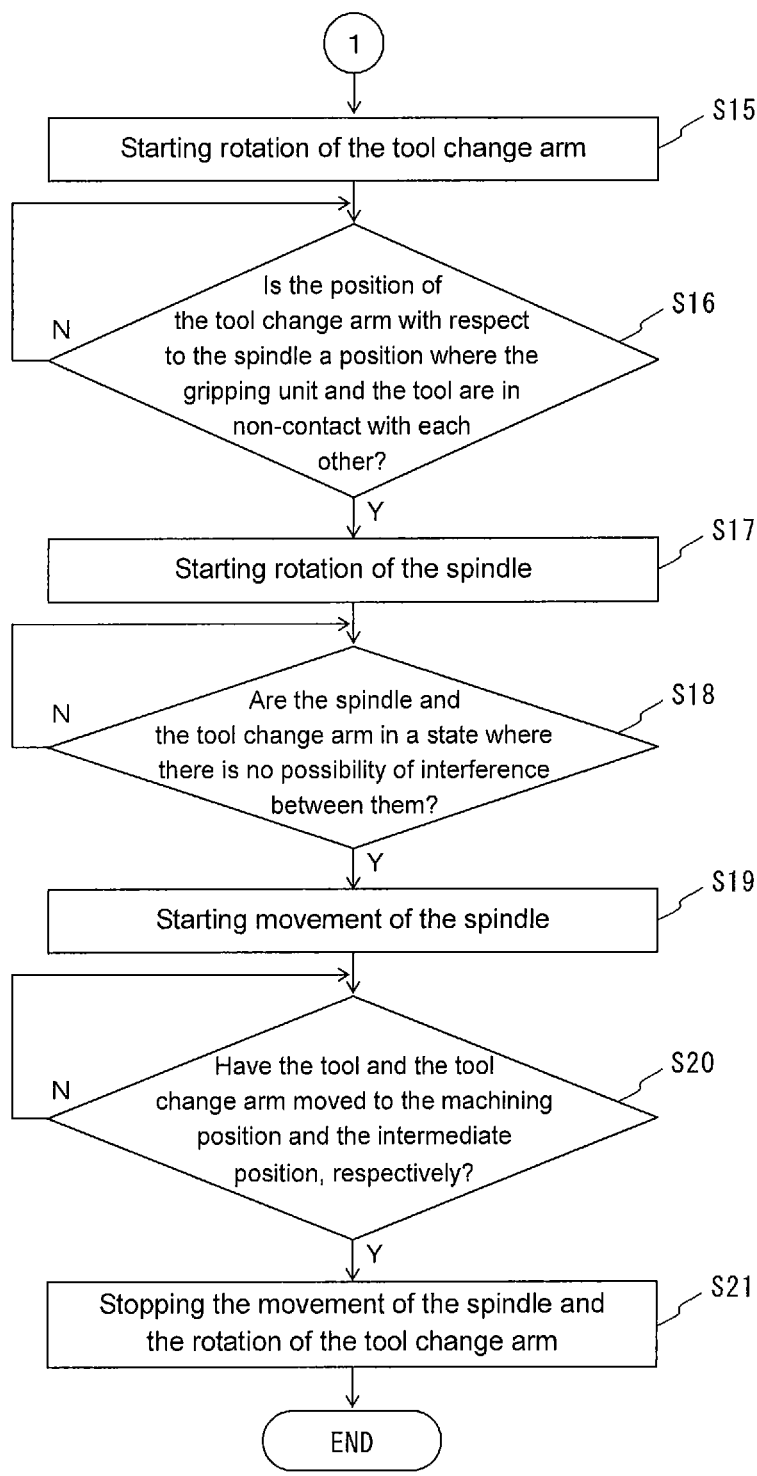
FIG. 8 is a flowchart of a tool change procedure in the machine tool according to the second embodiment.

After performing the processes up to step S6 in the controller 40 of the machine tool 1, as depicted in FIG. 8, the controller 52 transmits an operation command to the drive motor 23 to start the rotation of the tool change arm 25 in the reverse direction so that the tool change arm 25 rotates to the intermediate position (step S15), and determines whether the position of the tool change arm 25 with respect to the spindle 5 is a position where the gripping unit 26 and the tool T' mounted on the spindle 5 are disengaged from each other (step S16). When it is determined that the position of the tool change arm 25 is the position where they are disengaged from each other, an operation command is transmitted to the spindle rotation drive 8 to start the rotation of the spindle 5 (step S17), and the procedure proceeds to step S18. On the other hand, when it is determined that the position of the tool change arm 25 is not the position where they are disengaged from each other, the process at step S16 is performed again.

Next, it is determined whether there is a possibility of interference between the spindle 5 and the tool change arm 25 (step S18). Then, when it is determined that there is no possibility of interference, an operation command is transmitted to the feed drive 7 to start the movement of the spindle 5 (step S19). Then, it is determined whether the spindle 5 has moved to the machining position and the tool change arm 25 has rotated to the intermediate position (step S20). When it is determined that said movement of the spindle 5 and said rotation of the tool change arm 25 have been completed, the movement of the spindle 5 and the rotation of the tool change arm 25 are stopped (step S21), and the series of processes for tool change is ended. On the other hand, when it is determined that the spindle 5 has not moved to the machining position and the tool change arm 25 has not rotated to the intermediate position, the process at step S20 is performed again.

According to the machine tool 50 configured as described above, in accordance with the same procedure as in the machine tool 1, the tool T mounted on the spindle 5 and the tool T' held in the tool pot 11 are interchanged to mount the tool T' on the spindle 5 and hold the tool T in the tool pot 11. Thereafter, the rotating shaft 21 is started to rotate in the reverse direction, and the position of the tool change arm 25 with respect to the spindle 5 is detected by the proximity sensors 51. When the detected position becomes a position where the gripping unit 26 and the tool T' mounted on the spindle 5 are disengaged from each other, the rotation of the spindle 5 is started. Thereafter, with the spindle 5 moved to the machining position and the tool change arm 25 rotated to the intermediate position, the movement of the spindle 5 and the rotation of the tool change arm 25 are stopped. Note that the position where the gripping unit 26 and the tool T' mounted on the spindle 5 are disengaged from each other can be set in advance based on the dimensions of the tool T', the shape of the gripping unit 26, and the like.

As such, also in the machine tool 50 according to the second embodiment, based on the position of the tool change arm 25 with respect to the spindle 5 detected by the proximity sensors 51, the spindle 5 can be rotated at the time point when the gripping unit 26 and the tool T' mounted on the spindle 5 are disengaged from each other. Therefore, irrespective of the movement and moving direction of the spindle 5, the rotation of the spindle 5 can be started at the time point when it becomes possible to rotate the spindle 5, and thereby the standby time until machining is started can be reduced more than ever before.

Third Embodiment

Figure 9:
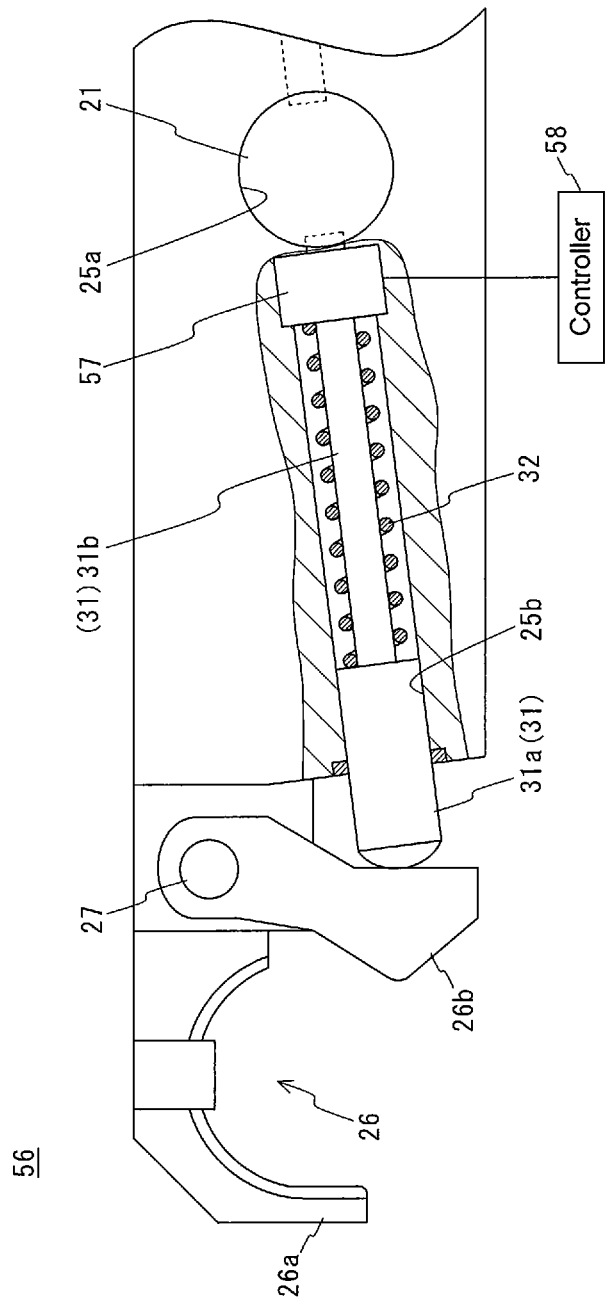
FIG. 9 is a partially sectional front view of a tool change arm in a machine tool according to a third embodiment of the present disclosure.

Next, a third embodiment is described with reference to FIG. 9 and FIG. 10, where the state where the tool mounted on the spindle and the tool change arm are disengaged from each other is detected based on a forward-backward position of the movable claw. Note that FIG. 9 is a partially-sectional front view of a tool change arm 56 provided to a machine tool according to the third embodiment, and the components identical in structure to those of the tool change arm 25 in the machine tool 1 are provided with the same reference characters and not described in detail. Further, FIG. 10 is a flowchart of a tool change procedure in the machine tool according to the third embodiment.

In the tool change arm 56 provided to the machine tool according to the third embodiment, a forward-backward position detector 57 is provided to a rear end side of the small-diameter unit 31*b* of the biasing rod 31. The forward-backward position detector 57 is configured to detect a forward-backward position of the movable claw 26*b* based on displacement of the biasing rod 31 and transmit the detection result to a controller 58.

Figure 10:
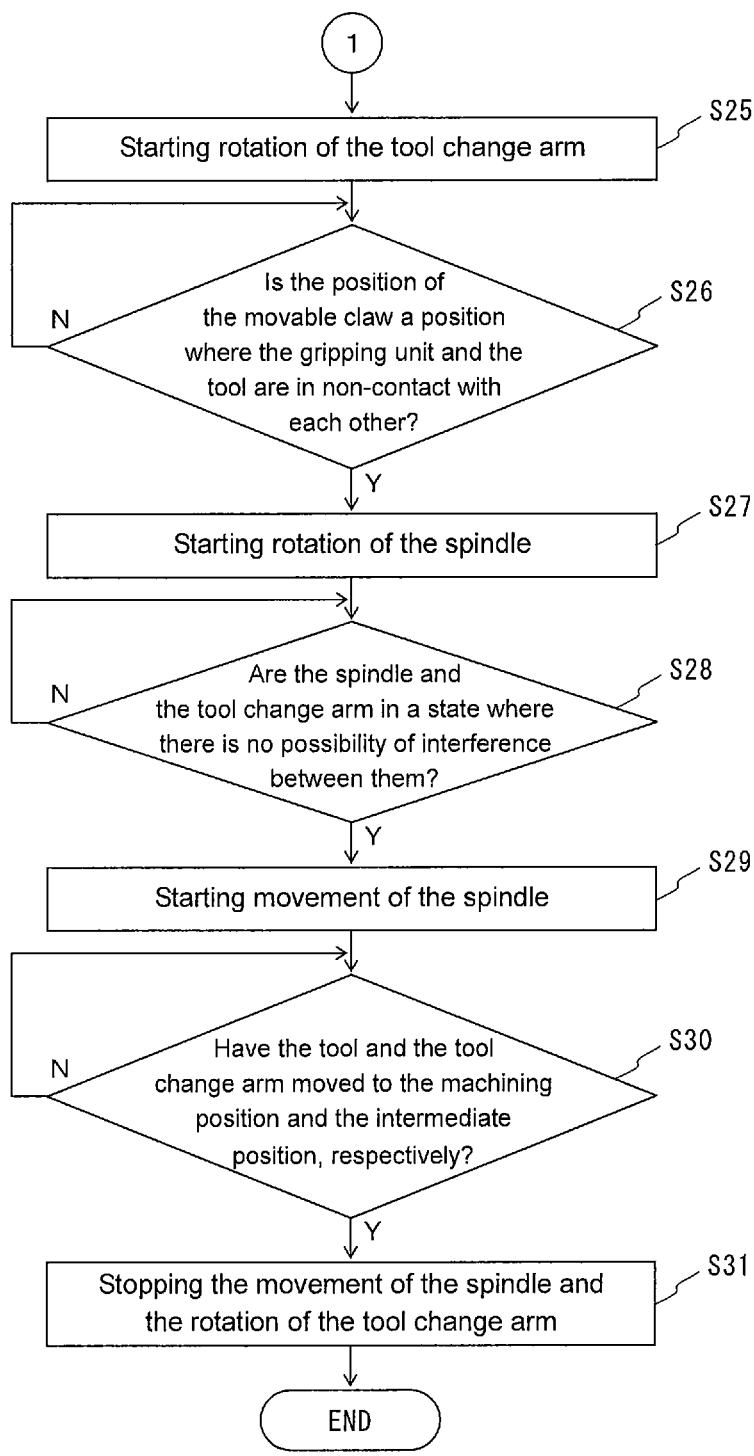
FIG. 10 is a flowchart of a tool change procedure in the machine tool according to the third embodiment.

Further, as with the control device 40, after performing the processes up to step S6, as depicted in FIG. 10, the controller 58 transmits an operation command to the drive motor 23 to start the rotation of the tool change arm 56 in the reverse direction so that the tool change arm 56 rotates to the intermediate position (step S25), and determines whether the forward-backward position of the movable claw 26*b* is a position where the gripping unit 26 and the tool T' mounted on the spindle 5 are disengaged from each other (step S26). When it is determined that the forward-backward position is the position where they are disengaged from each other, an operation command is transmitted to the spindle rotation drive 8 to start the rotation of the spindle 5 (step S27), and the procedure proceeds to step S28. On the other hand, when it is determined that the forward-backward position is not the position where they are disengaged from each other, the process at step S26 is performed again.

Next, it is determined whether there is a possibility of interference between the spindle 5 and the tool change arm 56 (step S28). When it is determined that there is no possibility of interference, an operation command is transmitted to the feed drive 7 to start the movement of the spindle 5 (step S29). Then, it is determined whether the spindle 5 has moved to the machining position and the tool change arm 56 has rotated to the intermediate position (step S30). When it is determined that the spindle 5 has moved to the machining position and the tool change arm 56 has rotated to the intermediate position, the movement of the spindle 5 and the rotation of the tool change arm 56 are stopped (step S31), and the series of processes for tool change is ended. On the other hand, when it is determined that the spindle 5 has not moved to the machining position and the tool change arm 56 has not rotated to the intermediate position, the process at step S30 is performed again.

According to the machine tool of the third embodiment, after the tool T' is mounted on the spindle 5 and the tool T is held in the tool pot 11 in accordance with the same procedure in the machine tool 1, the rotating shaft 21 is started to rotate in the reverse direction, and a forward-backward position of the movable claw 26*b* is detected by the forward-backward position detector 57. Then, the rotation of the spindle 5 is started at the time point when the detected forward-backward position becomes a forward-backward position where the gripping unit 26 and the tool T' mounted on the spindle 5 are disengaged from each other. Thereafter, the spindle 5 is moved to the machining position and the tool change arm 56 is rotated to the intermediate position, thereby completing tool change. Note that, similarly to the above, the position where the gripping unit 26 and the tool T' mounted on the spindle 5 are disengaged from each other can be set based on the dimensions of the tool T', the shape of the gripping unit 26, and the like.

As such, also in the machine tool according to the third embodiment, based on the forward-backward position of the movable claw 26*b* detected by the forward-backward position detector 57, the rotation of the spindle 5 is started at the time point when the gripping unit 26 and the tool T mounted on the spindle 5 are brought into the disengaged state. Therefore, irrespective of the movement and moving direction of the spindle 5, the rotation of the spindle 5 can be started, and the time until the spindle 5 reaches a predetermined number of revolutions can be reduced.

Fourth Embodiment

Figure 11:
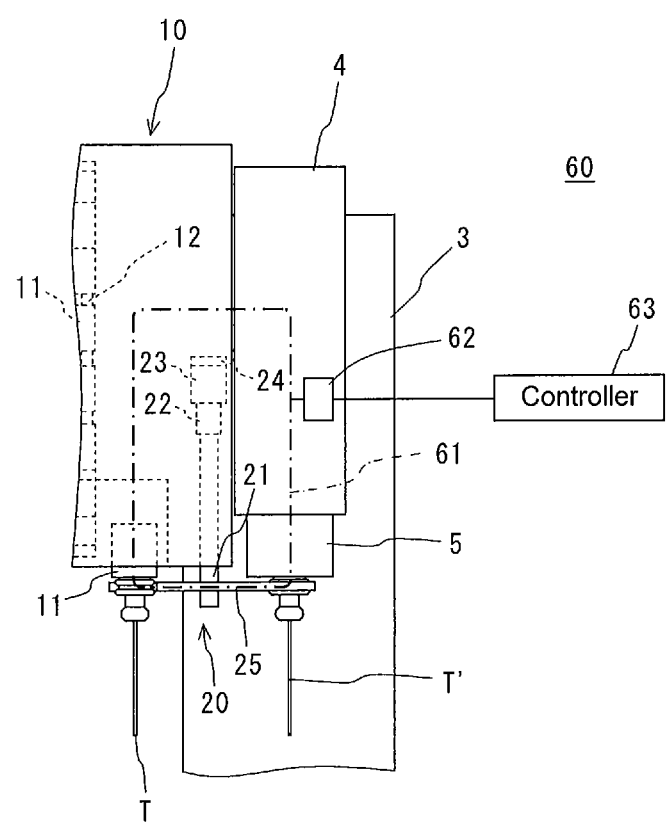
FIG. 11 is a partial front view of a machine tool according to a fourth embodiment of the present disclosure.

Next, a fourth embodiment is described with reference to FIG. 11 and FIG. 12, where the state where the tool mounted on the spindle and the tool change arm are disengaged from each other is detected based on whether an electrically closed circuit is formed among the tool mounted on the spindle, the spindle, a machine body of the machine tool, and the gripping unit of the tool change arm. Note that FIG. 11 is a partial front view of a machine tool 60 according to the fourth embodiment, and the components identical in structure to those of the machine tool 1 are provided with the same reference characters and not described in detail. Further, FIG. 12 is a flowchart of a tool change procedure in the machine tool 60.

The machine tool 60 includes a circuit 61 for forming an electrically closed circuit among the tool T' mounted on the spindle, the spindle 5, the spindle head 4, the tool magazine 10, the tool pot 11 transferred to the standby position, the tool T held in this tool pot 11 and the tool change arm 25, and a current detector 62 for detecting whether a current flows through the circuit 61. In the machine tool 60, in a state where the tools T and T' are gripped by the gripping units 26 of the tool change arm 25, that is, in a state where the gripping units 26 and the tools T and T' are in contact with each other, an electrically closed circuit is formed and therefore a current flows through the circuit 61. On the other hand, in a state where the tools T and T' are not gripped by the gripping units 26 of the tool change arm 25, that is, in a state where the gripping units 26 and the tools T and T' are disengaged from each other, an electrically closed circuit is not formed and therefore a current does not flow through the circuit 61. And, the current detector 62 detects whether a current flows through the circuit 61, and transmits the detection result to a controller 63.

Figure 12:
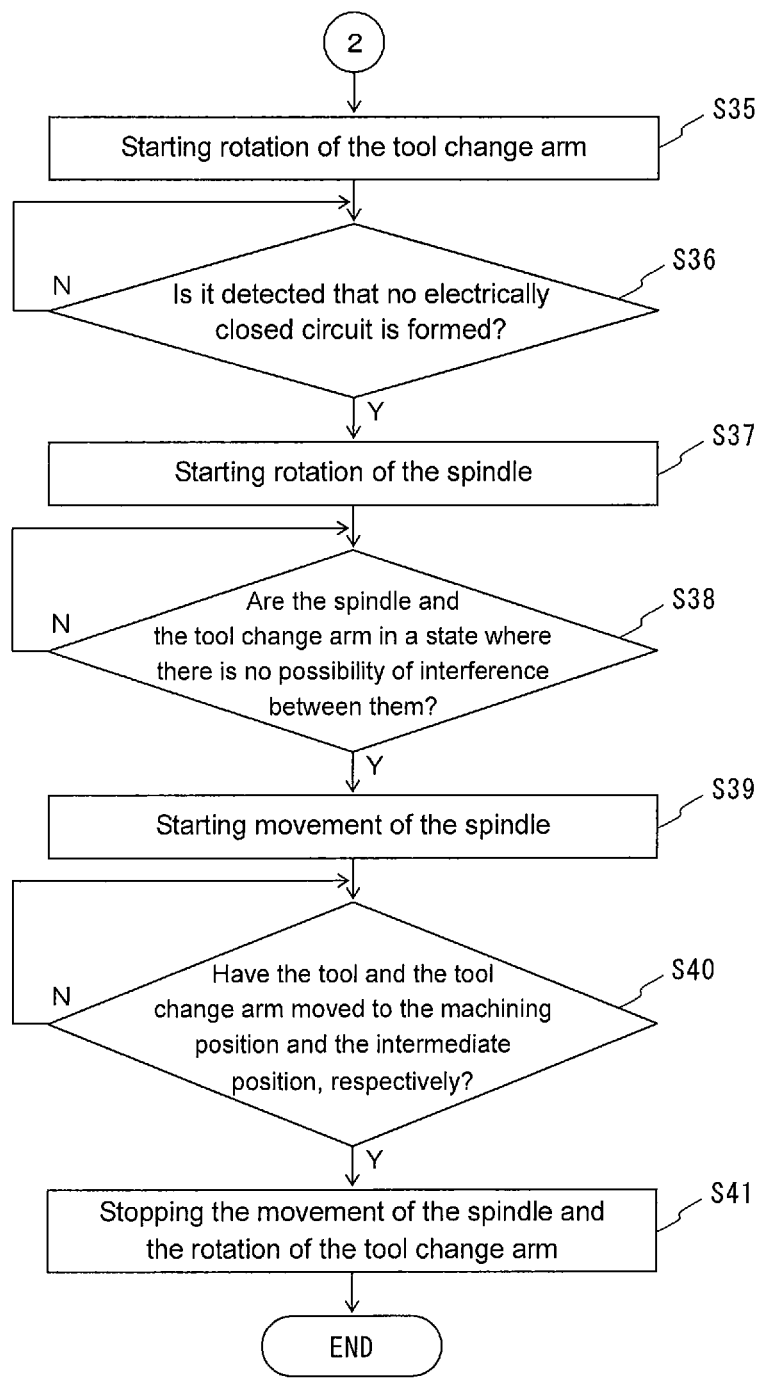
FIG. 12 is a flowchart of a tool change procedure in the machine tool according to the fourth embodiment.

After performing the processes up to step S6 similarly to the controller 40, as depicted in FIG. 12, the controller 63 transmits an operation command to the drive motor 23 to start the rotation of the tool change arm 25 in the reverse direction so that the tool change arm 25 rotates to the intermediate position (step S35), and determines whether an electrically closed circuit is formed (step S36). Then, when it is determined that an electrically closed circuit is not formed, an operation command is transmitted to the spindle rotation drive 8 to start the rotation of the spindle 5 (step S37), and the procedure proceeds to step S38. On the other hand, when it is determined that an electrically closed circuit is formed, the process at step S36 is performed again.

Next, it is determined whether there is a possibility of interference between the spindle 5 and the tool change arm 25 (step S38). Then, when it is determined that there is no possibility of interference, an operation command is transmitted to the feed drive 7 to start the movement of the spindle 5 (step S39). Thereafter, it is determined whether the spindle 5 has moved to the machining position and the tool change arm 25 has rotated to the intermediate position (step S40). When it is determined that the spindle 5 has moved to the machining position and the tool change arm 25 has rotated to the intermediate position, the movement of the spindle 5 and the rotation of the tool change arm 25 are stopped (step S41), and the series of processes for tool change is ended. On the other hand, when it is determined that the spindle 5 has not moved to the machining position and the tool change arm 25 has not rotated to the intermediate position, the process at step S40 is performed again.

According to the machine tool 60, in accordance with the same procedure as in the machine tool 1, the tool T' is mounted on the spindle 5 and the tool T is held in the tool pot 11. Then, the rotating shaft 21 is started to rotate in the reverse direction, and it is detected by the current detector 62 whether a current flows through the circuit 61. At the time point when a current stops flowing, that is, the formation of an electrically closed circuit stops, the rotation of the spindle 5 is started. Thereafter, the spindle 5 is moved to the machining position and the tool change arm 25 is rotated to the intermediate position, thereby completing tool change.

As such, in the machine tool 60 according to the fourth embodiment, based on the detection result by the current detector 62, the rotation of the spindle 5 is started at the time point when an electric closed circuit stops being formed, that is, when the tool change arm 25 and the tool T' mounted on the spindle 5 are disengaged from each other. Therefore, similarly to the above, irrespective of the movement and moving direction of the spindle 5, the rotation of the spindle 5 can be started prior to the movement thereof, and the standby time until machining is started can be reduced.

All references, including publications, patent applications, and patents, cited herein are hereby incorporated by reference. All methods described herein can be performed in any suitable order unless otherwise indicated herein or otherwise clearly contradicted by context. The use of any and all examples, or exemplary language (e.g., "such as") provided herein, is intended to illuminate the disclosed subject matter and does not pose a limitation on the scope of the claims. Any statement herein as to the nature or benefits of the exemplary embodiments is not intended to be limiting, and the appended claims should not be deemed to be limited by such statements. More generally, no language in the specification should be construed as indicating any non-claimed element as being essential to the practice of the claimed subject matter. The scope of the claims includes all modifications and equivalents of the subject matter recited therein as permitted by applicable law. Moreover, any combination of the above-described elements in all possible variations thereof is encompassed by the claims unless otherwise indicated herein or otherwise clearly contradicted by context. The description herein of any reference or patent, even if identified as "prior," is not intended to constitute a concession that such reference or patent is available as prior art against the present disclosure.

What is claimed is:

1. A machine tool comprising:
   a spindle;
   a feed drive which moves the spindle;
   a spindle rotation drive which rotates the spindle;
   a tool magazine which holds and stores a plurality of tools to be mounted on the spindle,
   a tool change arm provided with gripper units at both ends thereof and disposed between a first tool taken from the tool magazine that is mounted on the spindle and a second tool taken from the tool magazine that is held in a holder at a standby position;
   an arm rotation drive which rotates the tool change arm about an axis parallel to an axis of the spindle;
   a detector which detects a state where a given one of the gripper units, when positioned nearer the spindle than the standby position, is disengaged from an associated tool of the plurality of tools; and a controller operably coupled to the feed drive, the spindle rotation drive, and the arm rotation drive, wherein the controller is configured to:

move the spindle to a tool change position;

subsequently rotate the tool change arm in a predetermined direction from a start position for a tool change operation to cause the gripper units of the tool change arm to respectively grip the first tool taken from the tool magazine that has been mounted on the spindle and the second tool taken from the tool magazine that has been held in the holder at the standby position;

subsequently move the tool change arm forward in a direction along the axis of the spindle to detach the first and second tools respectively from the spindle and the holder;

subsequently rotate the tool change arm 180° to interchange positions of the first and second tools;

subsequently move the tool change arm backward in the direction along the axis of the spindle to mount the first tool on the holder and the second tool on the spindle;

thereafter rotate the tool change arm so that the tool change arm returns to the start position to release gripping of the second tool mounted on the spindle after the interchange;

during rotation of the tool change arm, before the tool change arm finishes returning to the start position, initiate rotation of the spindle at a time point when it is detected by the detector that the second tool mounted on the spindle and an associated gripper unit of the tool change arm are brought into a state of being disengaged from each other from a state of being in contact with each other; and move the spindle to a machining position either simultaneously with or after initiating rotation of the spindle.

2. The machine tool according to claim 1, wherein the detector comprises an angular position detector which detects an angular position of the tool change arm, and is configured to detect, based on the angular position detected by the angular position detector, that the second tool mounted on the spindle and the associated gripper unit of the tool change arm are brought into the state of being disengaged from each other.

3. The machine tool according to claim 1, wherein the detector comprises a position detector which detects a position of the tool change arm with respect to the spindle, and is configured to detect, based on the position detected by the position detector, that the second tool mounted on the spindle and the associated gripper unit of the tool change arm are brought into the state of being disengaged from each other.

4. The machine tool according to claim 1, wherein:

each of the gripper units has a fixed claw and a movable claw disposed opposite the fixed claw;

each of the gripper units is configured to grip one of the first and second tools by swinging the movable claw thereof toward the associated fixed claw and the one of the first and second tools;

the detector comprises a forward-backward position detector which detects a forward-backward position of each of the movable claws, and is configured to detect, based on the forward-backward position detected by the forward-backward position detector of the associated gripper unit of the tool change arm, that the second tool mounted on the spindle and the associated gripper unit of the tool change arm are brought into the state of being disengaged from each other.

5. The machine tool according to claim 1, wherein the detector comprises a current detector which detects formation of an electrically closed circuit between the second tool mounted on the spindle, the spindle, a machine body of the machine tool, and the gripper units of the tool change arm, and is configured to detect, based on whether the electrically closed circuit is formed, that the second tool mounted on the spindle and the associated gripper unit of the tool change arm are brought into the state of being disengaged from each other.

* * * * *